United States Patent
Smith et al.

(10) Patent No.: US 11,762,138 B2
(45) Date of Patent: Sep. 19, 2023

(54) MICROLENSES AND FILTER LAYERS FOR EMISSION CONTROL FROM A CURVED DISPLAY

(71) Applicant: SHARP KABUSHIKI KAISHA, Sakai (JP)

(72) Inventors: William Frederick Smith, Oxford (GB); David James Montgomery, Bampton (GB)

(73) Assignee: SHARP KABUSHIKI KAISHA, Sakai (JP)

( * ) Notice: Subject to any disclaimer, the term of this patent is extended or adjusted under 35 U.S.C. 154(b) by 309 days.

(21) Appl. No.: 17/134,158

(22) Filed: Dec. 24, 2020

(65) Prior Publication Data

US 2022/0206200 A1    Jun. 30, 2022

(51) Int. Cl.
   *G02B 5/28* (2006.01)
   *G02B 5/22* (2006.01)
   *G02B 5/02* (2006.01)
   *H10K 50/85* (2023.01)
   *H10K 50/858* (2023.01)

(52) U.S. Cl.
   CPC .............. *G02B 5/28* (2013.01); *G02B 5/0257* (2013.01); *G02B 5/22* (2013.01); *H10K 50/85* (2023.02); *H10K 50/858* (2023.02)

(58) Field of Classification Search
   CPC ........ G02B 3/005; G02B 5/0257; G02B 5/22; G02B 5/28; H01L 51/5262; H01L 51/5275
   See application file for complete search history.

(56) References Cited

U.S. PATENT DOCUMENTS

| | | | |
|---|---|---|---|
| 5,103,323 A | 4/1992 | Magarinos et al. | |
| 5,956,001 A * | 9/1999 | Sumida | H04N 13/337 348/E13.043 |
| 9,407,906 B2 * | 8/2016 | Kroon | G02B 30/27 |
| 2018/0359461 A1 * | 12/2018 | Koerber | H04N 13/305 |

FOREIGN PATENT DOCUMENTS

| | | |
|---|---|---|
| JP | 2003521181 A | 7/2003 |
| JP | 2005070639 A | 3/2005 |
| JP | 6648065 B2 | 2/2020 |
| WO | 2002/059657 A1 | 8/2002 |

* cited by examiner

*Primary Examiner* — Joseph P Martinez
*Assistant Examiner* — Vipin Patel
(74) *Attorney, Agent, or Firm* — ScienBiziP, P.C.

(57) ABSTRACT

A light emitting structure includes a pixel layer having at least one subpixel, a microlens layer having at least one microlens, the at least one microlens aligned with the at least one subpixel for providing a narrowly-confined on-axis emission profile along an on-axis direction, a first filler material layer and a second filler material layer between the pixel layer and the microlens layer, an interface between the first filler material layer and the second filler material layer configured for reflecting a portion of off-axis emissions from the at least one subpixel by total internal reflection (TIR).

16 Claims, 7 Drawing Sheets

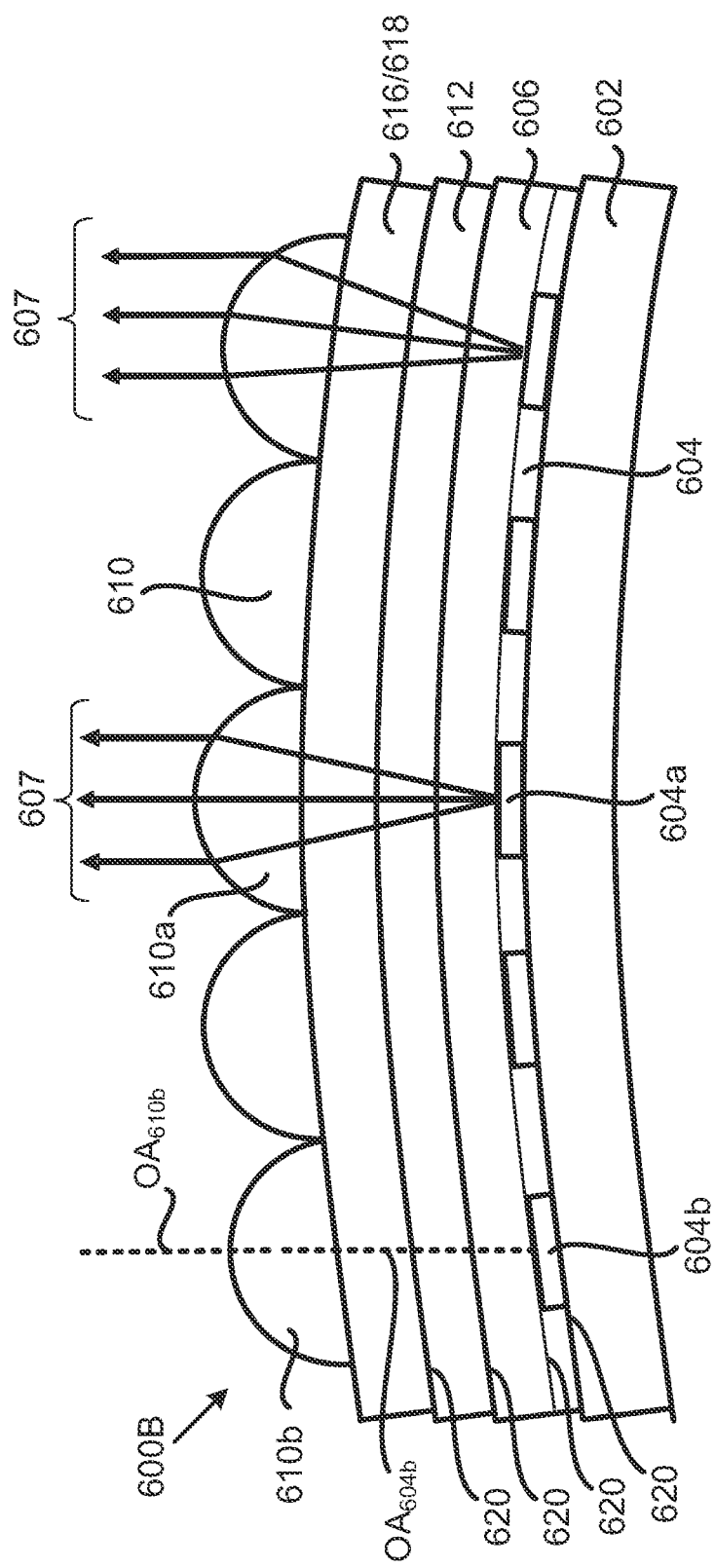

MICROLENSES AND FILTER LAYERS FOR EMISSION CONTROL FROM A CURVED DISPLAY

FIELD

The present disclosure generally relates to microlenses and filter layers used for emissive devices, in particular for curved automotive displays. In particular, the present disclosure seeks to improve narrowly-defined emission profiles for curved displays.

BACKGROUND

Screens are becoming increasingly prevalent in vehicles, e.g., automobile, and provide functions such as information, entertainment, and navigation. The potential market is enormous and display technologies offer a way for automotive manufacturers to differentiate their products. It is a challenging environment, as a display is subject to space limitations, environmental heat, electrical interferences, and ambient lighting ranging from direct sunlight to near total darkness.

Displays in vehicles, for example, curved displays in a dashboard area of a vehicle are becoming more prevalent. However, curved displays in vehicles, unlike displays used within a stationary enclosure (e.g., home, office, etc.), may emit light that can be a distraction to a vehicle operator. For example, light emitted from the vehicle display may reflect off the vehicle's side windows or the display screen being too wide may cause distractions to the operator, particularly at night. Thus, it is preferable to prevent light emissions towards the operator. In addition, a passenger next to the vehicle operator may view a screen directly in front, where some regions are prohibited from being visible to the operator. These are among some of the reasons for which a display device can provide a limited emission profile to allow control over the aforementioned challenges.

One approach to apply narrow emission profiles in a display device is a microlouvre film, which uses vertically aligned slats of absorbing material within a transparent medium. Microlouvre films are effective but inefficient and only work in one optical axis, such as an axis perpendicular to a display surface of a flat panel. Furthermore, microlouvre films confine light to a symmetrical distribution around the perpendicular axis. If applied to a curved display, the microlouvre films would render an appearance of brightness change to a viewer when viewed from different angles, which is undesirable and only acceptable when the display has low curvature.

Another approach to apply narrow emission profiles is a triple pass filter. Dolby (JP6648065B2) describes a system that uses curved triple notch pass filters to create stereoscopic images while Holographic Optics (U.S. Pat. No. 5,103,323A) shows how triple notch reflective holographic filters allow laser light to be reflected to the user.

Microlenses, which efficiently convert a small light source with wide divergence into a larger light source with narrower divergence, could be another alternative to microlouvre films and triple pass filters to apply narrow emission profiles. For a display where the emitting area of pixels is a quarter of a total area, the angular divergence would be halved. However, microlenses suffer from secondary emissions (secondary windows), which is where partial light emissions from one pixel enter a microlens neighboring the nearest microlens with respect to the pixel. The neighboring microlens tends to refract the partial light emissions that would exit the neighboring microlens at a shallow angle relative to the display surface of the display, and the partial light emissions could reflect off a window and distract the vehicle operator. Besides secondary emissions, tertiary emissions (tertiary windows) and beyond are also possible.

Another approach to control emission profile is to adjust the viewing angles with microlenses. For example, Fuji (JP2005070639A) describes how microlenses can be arranged in an irregular manner to narrow the viewing angle, and Am Onar (WO2002059657A1) describes how narrowing viewing angles sufficiently with microlenses can provide an autostereoscopic system.

In yet another approach, secondary color filters are used with displays to control emission profile. For example, 4D-Vision Gmbh (JP2003521181A) describes how striped color filters can select for light leaving the display and yield an autostereoscopic device.

CITATION LIST

Japan Pat. No. JP 6648065 B2 (Dolby Laboratories Licensing Corporation, patented Feb. 14, 2020).
U.S. Pat. No. 5,103,323 A (Holographic Optics Inc, patented Apr. 7, 1992).
Japan Pub. No. JP 2005 070639 A (Fuji Photo Film Co Ltd, published Mar. 17, 2005).
International Pub. No. WO 2002/059657 A1 (ÅM, Onar, published Aug. 1, 2002).
Japan Pub. No. JP 2003 521181 A (4D-Vision GmbH, published Jul. 8, 2003).

SUMMARY

The present disclosure relates to microlenses and filter layers for emission control from a curved display.

In a first aspect of the present disclosure, a light emitting structure includes a pixel layer having at least one subpixel, a microlens layer having at least one microlens, the at least one microlens aligned with the at least one subpixel for providing a narrowly-confined on-axis emission profile along an on-axis direction, a first filler material layer and a second filler material layer between the pixel layer and the microlens layer, an interface between the first filler material layer and the second filler material layer configured for reflecting a portion of off-axis emissions from the at least one subpixel by total internal reflection (TIR).

In an implementation of the first aspect, the light emitting structure further includes one or more filter layers between the pixel layer and the microlens layer, the one or more filter layers configured for preventing another portion of the off-axis emissions from interfering with on-axis emissions of at least one adjacent subpixel.

In another implementation of the first aspect, the first filler material layer is formed on the second filler material layer, a first refractive index of the first filler material layer is lower than a second refractive index of the second filler material layer.

In yet another implementation of the first aspect, the portion of the off-axis emissions includes light emitted along an off-axis direction at an angle to the on-axis direction towards at least one neighboring microlens of the at least one adjacent subpixel, wherein the light emitted along the off-axis direction, which would otherwise pass through the at least one neighboring microlens, is reflected by the interface by TIR.

In yet another implementation of the first aspect, the another portion of the off-axis emissions includes light emitted along an off-axis direction at an angle to the on-axis direction towards at least one neighboring microlens of the at least one adjacent subpixel, wherein the light emitted along the off-axis direction, which would otherwise pass through the at least one neighboring microlens, is filtered by the one or more filter layers.

In yet another implementation of the first aspect, the one or more filter layers include at least one of a color filter layer and a triple pass filter layer; the light emitted along the off-axis direction is absorbed by the color filter layer; and the light emitted along the off-axis direction is reflected by the triple pass filter layer by TIR.

In yet another implementation of the first aspect, the narrowly confined on-axis emission profile includes light emitted along the on-axis direction through only the at least one microlens.

In yet another implementation of the first aspect, the one or more filter layers includes a color filter layer, the color filter layer includes at least one color filter, the at least one color filter aligned with the at least one subpixel for passing at least one on-axis emission from the at least one subpixel and filtering at least one off-axis emission from the at least one adjacent subpixel.

In yet another implementation of the first aspect, the light emitting structure further includes one or more shear adhesive layers between the pixel layer and the microlens layer, wherein the one or more shear adhesive layers are configured to maintain optical alignment of the at least one microlens with the at least one subpixel for providing the narrowly-confined on-axis emission profile when the light emitting structure is subjected to elastic deformation.

In yet another implementation of the first aspect, the light emitting structure further includes one or more shear adhesive layers between the pixel layer and the microlens layer, wherein at least one of the one or more shear adhesive layers includes a low viscosity adhesive material or a vertical-supporting adhesive material.

In yet another implementation of the first aspect, the light emitting structure further includes one or more filter layers between the pixel layer and the microlens layer, the one or more filter layers including one of a color filter layer and a triple pass filter layer, the light emitted along an off-axis direction is absorbed by the color filter layer, the light emitted along the off-axis direction is reflected by the triple pass filter layer by TIR, and one or more shear adhesive layers between the pixel layer and the microlens layer, and configured to maintain optical alignment of the at least one microlens with the at least one subpixel for providing the narrowly-confined on-axis emission profile when the light emitting structure is subjected to elastic deformation, where the first filler material layer is formed on the second filler material layer, a first refractive index of the first filler material layer is lower than a second refractive index of the second filler material layer such that the interface reflects a portion of off-axis emissions from the at least one subpixel by TIR.

In a second aspect of the present disclosure, a display device includes a pixel layer having a plurality of subpixels, a microlens layer having a plurality of microlenses, each of the plurality of microlenses being aligned with a corresponding one of the plurality of subpixels, a first filler material layer and a second filler material layer between the pixel layer and the microlens layer, an interface between the first filler material layer and the second filler material layer configured for reflecting a portion of off-axis emissions from the plurality of subpixels by total internal reflection (TIR).

In an implementation of the second aspect, the display device further includes at least one of a color filter layer and a triple pass filter layer between the pixel layer and the microlens layer, the at least one of the color filter layer and the triple pass filter layer configured for preventing another portion of the off-axis emissions from interfering on-axis emissions from the plurality of subpixels.

In another implementation of the second aspect, the triple pass filter layer includes a plurality of triple pass filters for passing the on-axis emissions and filtering the off-axis emissions, and the color filter layer includes at least one color filter, the at least one color filter aligned with at least one of the plurality of subpixels for passing at least one on-axis emission from the at least one of the subpixels and filtering at least one off-axis emission from at least one adjacent subpixel.

In yet another implementation of the second aspect, the first filler material layer is formed on the second filler material layer, a first refractive index of the first filler material layer is lower than a second refractive index of the second filler material layer.

In yet another implementation of the second aspect, the portion of the off-axis emissions includes light emitted along an off-axis direction at an angle to an on-axis direction towards at least one neighboring microlens of at least one adjacent subpixel, wherein the light emitted along the off-axis direction, which would otherwise pass through the at least one neighboring microlens, is reflected by the interface by TIR.

In yet another implementation of the second aspect, the another portion of the off-axis emissions includes light emitted along an off-axis direction at an angle to an on-axis direction towards at least one neighboring microlens of at least one adjacent subpixel, wherein the light emitted along the off-axis direction, which would otherwise pass through the at least one neighboring microlens, is absorbed by the color filter layer or is reflected by the triple pass filter layer by TIR.

In yet another implementation of the second aspect, the display device further includes one or more shear adhesive layers between the pixel layer and the microlens layer, wherein the one or more shear adhesive layers are configured to keep at least one of the plurality of microlenses aligned with the corresponding one of the plurality of subpixels, when the display device is subjected to elastic deformation.

In yet another implementation of the second aspect, the display device further includes one or more shear adhesive layers between the pixel layer and the microlens layer, wherein the one or more shear adhesive layers are configured to keep at least one of the plurality of microlenses aligned with the corresponding one of the plurality of subpixels, when the display device is subjected to elastic deformation.

In yet another implementation of the second aspect, the display device further includes one or more filter layers between the pixel layer and the microlens layer, the one or more filter layers including one of a color filter layer and a triple pass filter layer, the light emitted along an off-axis direction is absorbed by the color filter layer, the light emitted along the off-axis direction is reflected by the triple pass filter layer by TIR, and one or more shear adhesive layers between the pixel layer and the microlens layer, and configured to maintain optical alignment of the at least one microlens with the at least one subpixel for providing the narrowly-confined on-axis emission profile when the display device is subjected to elastic deformation, where the first filler material layer is formed on the second filler material layer, a first refractive index of the first filler material layer is lower than a second refractive index of the second filler material layer such that the interface reflects a portion of off-axis emissions from the at least one subpixel by TIR.

BRIEF DESCRIPTION OF DRAWINGS

Aspects of the present disclosure are best understood from the following detailed description when read with the accompanying figures. Various features are not drawn to scale. Dimensions of various features may be arbitrarily increased or reduced for clarity of discussion.

FIG. 6B is a schematic cross-sectional view of the example light emitting structure in FIG. 6A, under elastic deformation in accordance with an example implementation of the present disclosure.

DESCRIPTION

Figure 1:
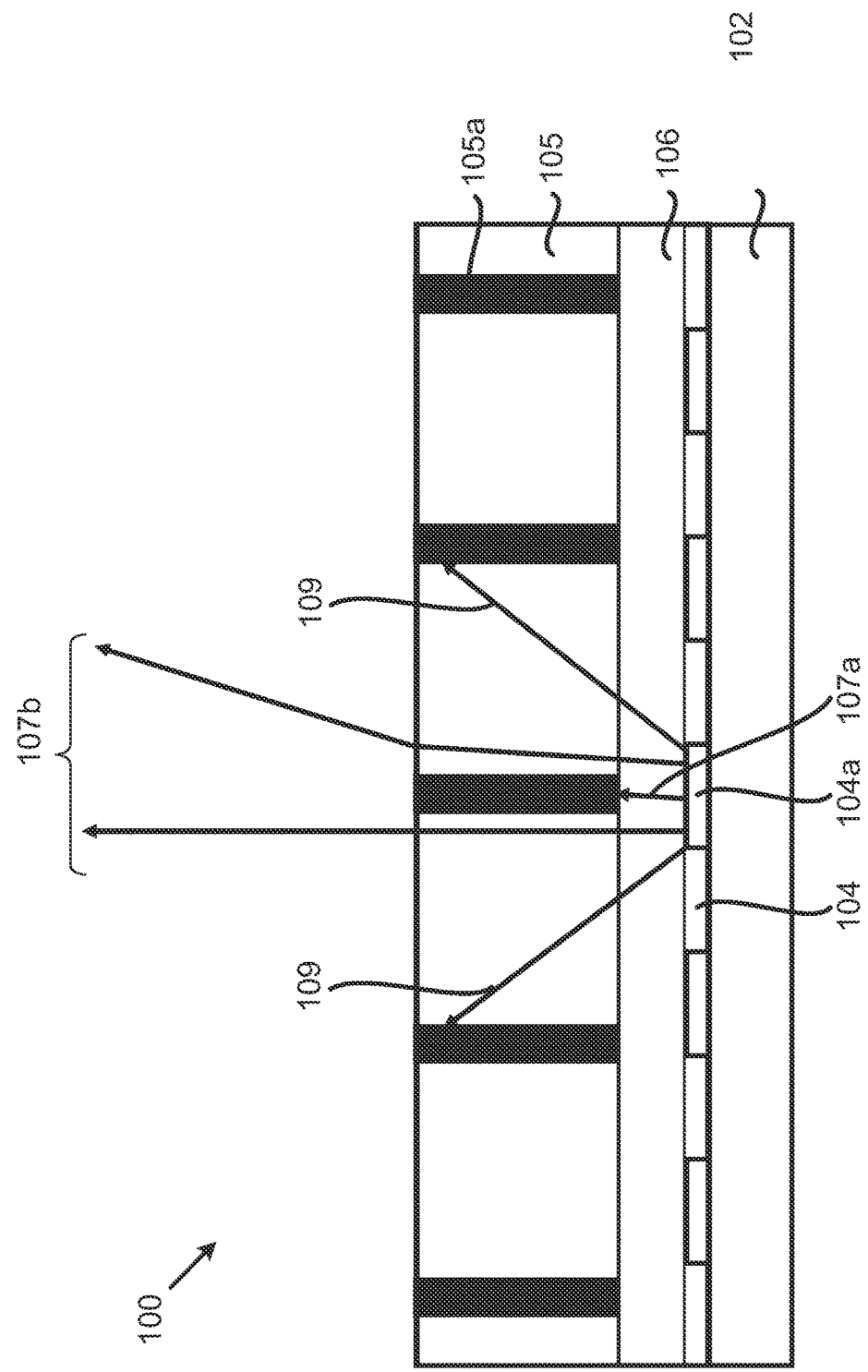
FIG. 1 is a schematic cross-sectional view of a light emitting structure with a microlouvre layer.

The following disclosure contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art.

Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purposes of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "comprising" means "including, but not necessarily limited to" and specifically indicates open-ended inclusion or membership in the so-described combination, group, series, and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

The present disclosure relates to a design for a curved display with a narrowly-confined emission profile. The curvature of the display may subtent an arc that exceeds 50°, and the emission profile may be confined to within 40°. Typically, curvature will be limited to one axis, giving a cylindrical curvature to the device. Some limited twisting is common for the device application, and curvature along multiple axes may be possible. Restriction of panel emission may be confined to one or both axes.

The present disclosure aims to preserve the advantages of microlenses, but avoid the undesirable secondary and tertiary emissions from exiting the pixels that can distract a vehicle operator. The display device of the present disclosure includes, at least, a microlens layer and a pixel layer. In the present disclosure, a microlens may have other shapes besides semi-spherical, but the microlens is a single refractive lens with at least one curved surface. In order to provide a narrowly-confined emission profile without the undesirable secondary or tertiary emissions, at least two out of three layers as described below are included between the microlens layer and the pixel layer.

In one or more implementations of the present disclosure, the display device may include a light emitting structure that may have a low index layer and a high index layer between a pixel layer having a plurality of sub-pixels and a microlens layer having a plurality of microlenses. The high index layer may be located proximate to the pixel layer while the low index layer maybe located proximate to the microlens layer. The low index layer may be an air, nitrogen, or vacuum filled layer, a liquid layer, a glue layer, or a flexible adhesive. In the present disclosure, the low index layer is preferably a polymer with a refractive index of approximately 1.1 to 1.5, while preferably of 1.15 or 1.2 to 1.3. If the layer is filled with air, then it may include longitudinal supports between the high index layer and the microlens layer to ensure correct alignment and spacing. The low index layer and the high index layer create a high index to low index interface therebetween to confine the light rays emitted at wide angles (e.g., tertiary emissions) through total internal reflection (TIR). In conventional systems, TIR would occur at a cover glass to air (e.g., in the environment) interface, but when the last surface is an array of microlenses instead of a flat cover glass, light that would otherwise be trapped may escape through the curved surfaces of the microlenses.

In one or more implementations of the present disclosure, the light emitting structure may also include a color filter layer between the microlens layer and the pixel layer. The color filter layer may include an array of red, green, and blue filters with each color filter respectively aligned with one of the pixels in the pixel layer. Such arrangement prevents secondary emissions of a pixel from entering a color filter corresponding to a neighboring pixel. For example, since a red pixel is not immediately adjacent to any other red pixels, light emitted at somewhat shallow angles will pass through the red filter and enter the desired microlens immediately above the pixel, or will be absorbed by the green and blue filters surrounding that lens. However, a limited amount of light may possibly be tertiary emissions.

In one or more implementations of the present disclosure, the light emitting structure may also include a dichroic interference filter or an interference filter layer, such as a triple pass filter, between the microlens layer and the pixel layer. The interference filter layer may be designed to transmit light emitted from pixels of three color bands, such as red, green, and blue color bands (e.g., the range of wavelengths encompassing red, green, and blue color) only when emissions of the color bands are on axis with respect to the pixel, but may reflect the light emissions that are incident off axis. Such filter layer may prevent secondary and tertiary emissions and does not require patterning. Care must be taken to ensure the interference filter layer is flexible and to ensure that acceptance angles are within the range of curvature of the display panel.

In one or more implementations of the present disclosure, the light emitting structure may also include one or more shear adhesive layers to maintain optical alignment of at least one microlens in the microlens layer with at least one sub-pixel in the pixel layer while providing a narrowly-confined on-axis emission profile when the light emitting structure is under elastic deformation. In one or more implementations of the present disclosure, an "on-axis" direction of the on-axis emission is not necessarily emission normal to the display plane but substantially normal to the display plane as long as the emission does not emit to the neighboring microlens. The one or more shear adhesive layers allow for some shear motion between any two layers above while continue to confine separation between the microlens layer and the pixel layer. It should be noted that the interference layers are easier to apply with the shear adhesive layers than microlouvres. The shear adhesive layers may be low viscosity adhesives or vertical supporting structures. The light emitting structure with shear adhesive layers allows the microlenses to move in a transverse direction relative to the sub-pixels while maintaining optical alignment with respect to the microlenses, the sub-pixels, and viewer's eyes when the light emitting structure is bent. In other words, when the light emitting structure, including at least two of the three aforementioned layers, is bent, an optical axis through the center of a sub-pixel and an optical axis through the center of a microlens align with an optical axis through the viewer's eyes so that the viewer would perceive similar display brightness from the curved display device.

In one or more implementations of the present disclosure, the light emitting structure may include one or more filter layers between the pixel layer and the microlens layer, and one or more shear adhesive layers between the pixel layer and the microlens layer. The one or more filter layers may include one of the color filter layer and the triple pass filter layer, the light emitted along an off-axis direction is absorbed by the color filter layer, the light emitted along the off-axis direction is reflected by the triple pass filter layer by TIR. The one or more shear adhesive layers may be configured to keep the at least one microlens aligned with the at least one subpixel for providing the narrowly-confined on-axis emission profile when the light emitting structure is subjected to elastic deformation. The first filler material layer may be formed on the second filler material layer, and a first refractive index of the first filler material layer is lower than a second refractive index of the second filler material layer such that the interface reflects a portion of off-axis emissions from the at least one subpixel by TIR.

FIG. 1 is a schematic cross-sectional view of a light emitting structure 100 with a microlouvre layer. In FIG. 1, the light emitting structure 100 may include a substrate 102, a pixel layer 104 including a plurality of sub-pixels (e.g., 104a), a filler material 106, and a microlouvre layer 105 including a plurality of vertically-oriented slats 105a.

In FIG. 1, the structure 100 illustrates example components of a microlouvre-based emission-controlled structure in a display device. Light may be emitted from the sub-pixel 104a near the bottom of the structure 100, with a broad angular range. Some on-axis light emissions travel vertically 107a and 107b in which some emissions 107a incident on the slats 105a are lost due to absorption by the slats 105a while other emissions 107b travel unimpeded to the front of the display device and leave the display device with a narrow angular distribution or emission profile. Off-axis emissions 109 travel at a much wider angle with respect to the on-axis emissions 107a and 107b, which may distract an operator of a vehicle.

Figure 2:
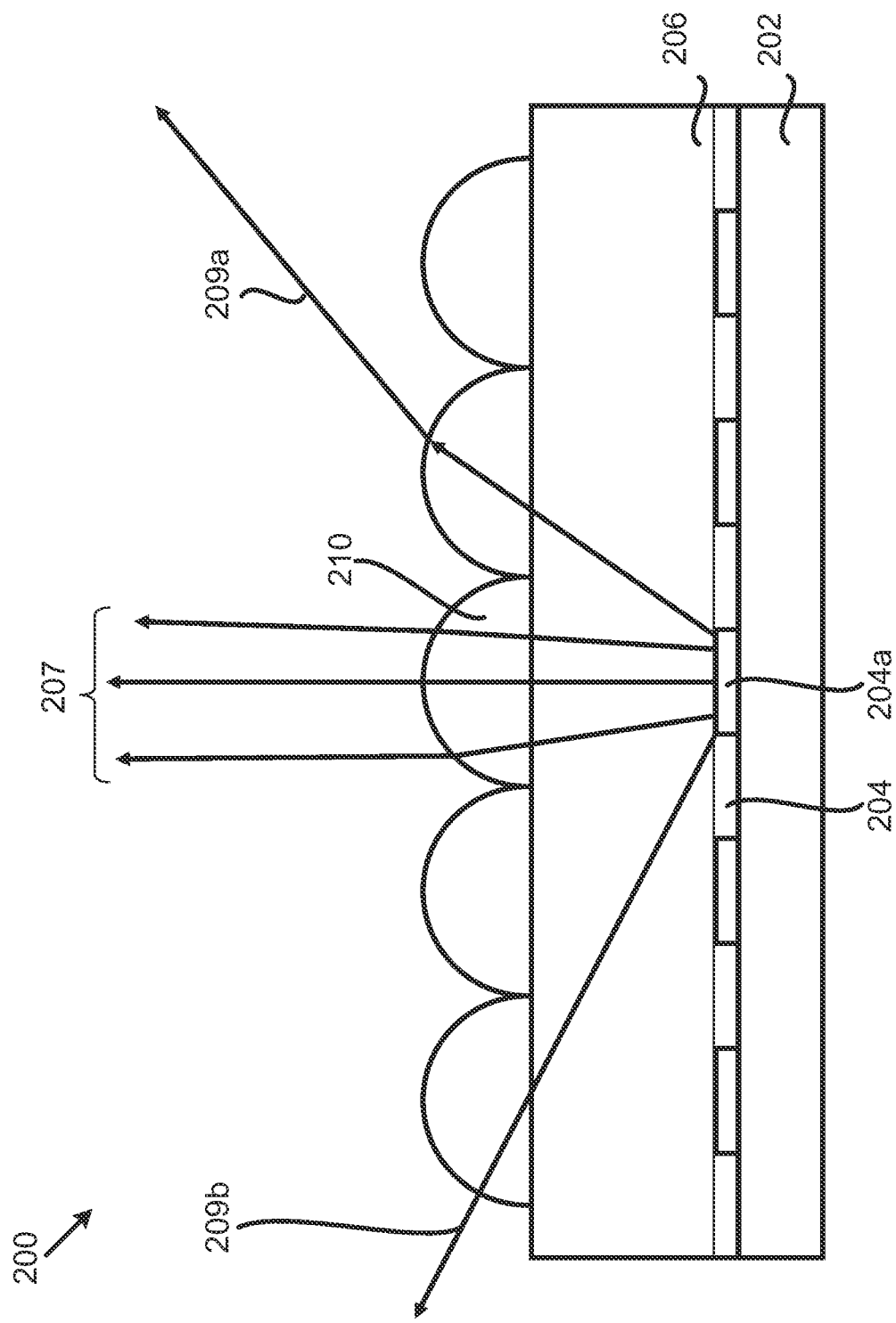
FIG. 2 is a schematic cross-sectional view of a light emitting structure with a microlens layer.

FIG. 2 is a schematic cross-sectional view of a light emitting structure 200 with a microlens layer. The light emitting structure 200 may include a substrate 202, a pixel layer 204 including a plurality of sub-pixels (e.g., 204a), a filler material 206, and a microlens layer 210 including a plurality of microlenses. The substrate 202, the pixel layer 204 including the plurality of sub-pixels, and the filler material 206 may correspond to the substrate 102, the pixel layer 104 including the plurality of sub-pixels, and the filler material 106, respectively, of the structure 100 in FIG. 1.

In FIG. 2, the light emitting structure 200 illustrates example components of a microlens-based emission-controlled structure in a display device. Light may be emitted from the sub-pixel 204a near the bottom of the structure 200. Brightness from on-axis emissions of the display device can be improved greatly with an array of microlenses 210, each of which may narrow the on-axis emission profile of light (e.g., narrowly-confined on-axis emission profile) 207 from the nearest pixel (e.g., 204a in FIG. 2). However, there are other light emissions that are off-axis (e.g., 209a and 209b) with respect to the on-axis emissions 207. For example, secondary emissions (e.g., windows or light paths) 209a and tertiary emissions (e.g., windows or light paths) 209b, where microlenses 210 do not narrow, and may even broaden, the emission profile. These secondary and tertiary light paths can be detrimental for an automotive display, for example. In this example, a secondary or tertiary path may be incident on the windscreen or other window and cause distraction to the driver.

Figure 3:
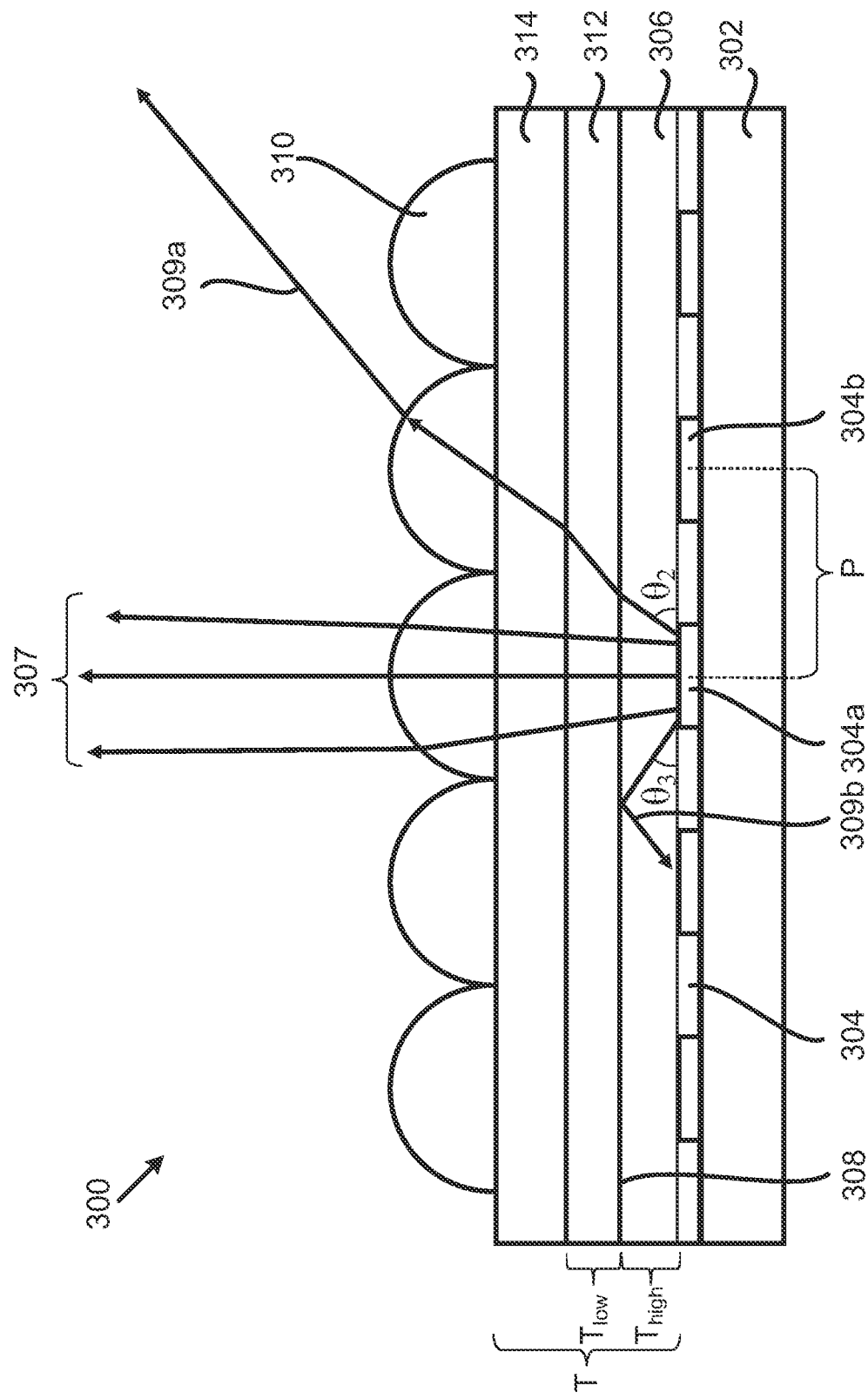
FIG. 3 is a schematic cross-sectional view of an example light emitting structure in accordance with an example implementation of the present disclosure.

FIG. 3 is a schematic cross-sectional view of an example light emitting structure 300 in accordance with an example implementation of the present disclosure. The light emitting structure 300 may include a substrate 302, a pixel layer 304 including a plurality of sub-pixels (e.g., 304a, 304b), a second filler material 306, a first filler material 312, a glass substrate 314, and a microlens layer 310 including a plurality of microlenses. In one or more implementations of the present disclosure, the substrate 302, the pixel layer 304 including the plurality of sub-pixels, and the second filler material 306 may correspond to the substrate 202, the pixel layer 204 including the plurality of sub-pixels 204a, and the filler material 206, respectively, of the structure 200 in FIG. 2, thus details of example structure 300 are omitted for brevity.

In one or more implementations of the present disclosure, on-axis light emissions 307 may transmit through the second filler material 306, the first filler material 312, the glass cover 314, and the microlens layer 310 in a narrowly-defined emission profile.

In one or more implementations of the present disclosure, the second filler material 306 (e.g., a high index layer) may have a higher refractive index than a refractive index of the first filler material 312 (e.g., a low index layer). The first filler material 312 having a lower index may remove a portion of the off-axis emissions (e.g., tertiary emissions) 309b that produce light with a shallow angle with respect to the light emitting structure 300. In FIG. 3, the off-axis tertiary emission 309b is removed by the first filler material 312 having the lower refractive index while the secondary emission 309a is displaced but not removed. Specifically, the first filler material 312 having the lower index and the second filler material 306 having the higher index create an interface 308 between the first filler material 312 and the second filler material 306 such that a portion of off-axis emissions, such as the tertiary off-axis emission 309b, from the subpixel 304a is reflected within the light emitting structure 300 by TIR without reaching the first filler material 312, thus tertiary emission 309b is removed.

In another example implementation, the first filler material 312 may be a low index layer to prevent scattering. For example, the first filler material 312 may be an aerogel layer that is highly porous. The first filler material 312 may form a layer that has a thickness of equal to or greater than 4 um.

In one or more implementations, angular emissions for the off-axis emissions, specifically, a secondary angle $\theta_2$ at which the secondary emissions 309a may emit or a tertiary angle $\theta_3$ at which the tertiary emissions 309b may emit with respect to an emissive surface of the sub-pixel 304a is related to a pitch P and a thickness T, where P is a distance from a center of a sub-pixel 304a to a center of an adjacent sub-pixel 304b and T is a distance between the pixel layer 304 (e.g., the emissive surface of the sub-pixel 304a in FIG. 3) and the microlens layer 310 (e.g., the bottom surface of the microlens layer 310 in FIG. 3). If a maximum secondary angle $\theta_2$ and a maximum tertiary angle $\theta_3$ in which the secondary and tertiary off-axis emissions 309a, 309b may potentially be emitted are determined, the thickness T and the pitch P may also be determined to satisfy the maximum angles. The correlation described above between the secondary angle $\theta_2$, tertiary angle $\theta_3$, pitch P, and thickness T may be represented by the following equations:

$$\tan \theta_2 = T/(P/2) \quad \text{Equation (1), and}$$

$$\tan \theta_3 = T/(3*P/2) \quad \text{Equation (2).}$$

It should be noted that Equations (1) and (2) assume the thicknesses of the layers making up T are weighted by their refractive indices if the layers differ in refractive index, and only are the actual thickness if the refractive indices are the same.

Moreover, a refractive index $N_{low}$ of the first filler material 312 (e.g., low index layer) and a refractive index $N_{high}$ of the second filler material 306 (e.g., high index layer) may be determined by an angle of the emissions being totally internally reflected by the interface 308. Specifically, the refractive indices $N_{low}$ and $N_{high}$ correlate to the angle of the emissions being totally internally reflected by the interface 308 in the following equation (Snell's Law):

$$N_{high}*\sin(90-\theta) = N_{low} \quad \text{Equation (3),}$$

where $N_{high}$ and $N_{low}$, the refractive indices of the high and low layers.

In one implementation, the angle of the emissions being totally internally reflected by the interface 308 can be the same as the tertiary angle $\theta_3$. Due to the interface 308, only the tertiary off-axis emissions 309b are removed, thus narrowing the overall emission profile of the light emitting structure 300. It can be arranged that the secondary angle $\theta_2$ can be chosen so that there is no secondary emission. Thus, the angle $\theta$ in Equation 3 would correspond to the angle $\theta_2$ calculated in Equation 1 to determine the refractive indices of the two layers.

Figure 4:
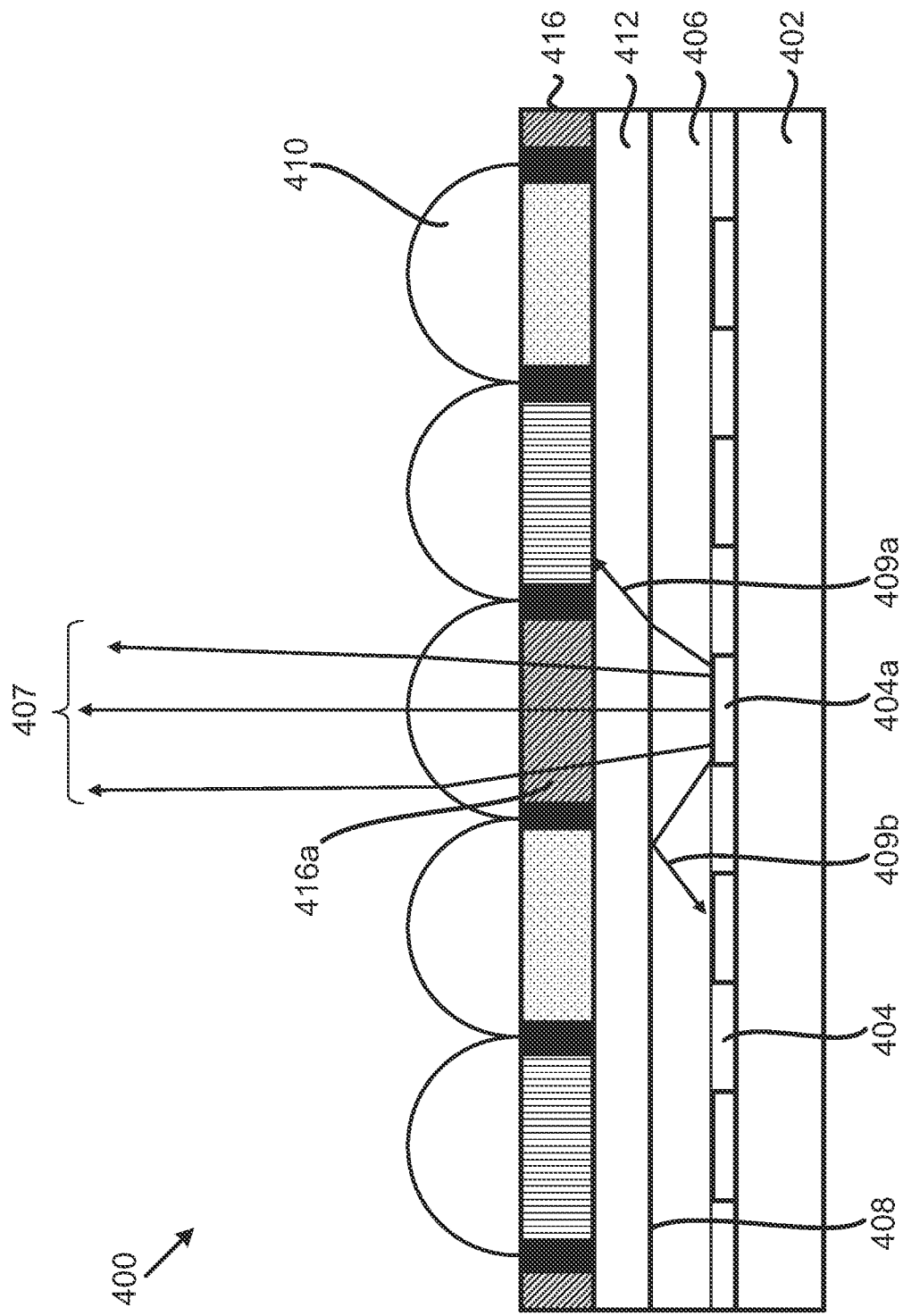
FIG. 4 is a schematic cross-sectional view of an example light emitting structure in accordance with an example implementation of the present disclosure.

FIG. 4 is a schematic cross-sectional view of an example light emitting structure 400 in accordance with an example implementation of the present disclosure.

The example light emitting structure 400 in FIG. 4 may include a substrate 402, a pixel layer 404 including a plurality of sub-pixels (e.g., 404a), a second filler material 406, a first filler material 412, a color filter layer 416, and a microlens layer 410 including a plurality of microlenses. In one or more implementations of the present disclosure, the substrate 402, the pixel layer 404 including the plurality of sub-pixels, the second filler material 406, the first filler material 412, and the microlens layer 410 may correspond to the substrate 302, the pixel layer 304 including the plurality of sub-pixels (e.g., 304a), the second filler material 306, the first filler material 312, and the microlens layer 306, respectively, of the structure 300 in FIG. 3. Therefore, the details of the example structure 400 are omitted for brevity. It should be noted that the subpixels are generally colored (e.g., red, green or blue) and the corresponding color for a pixel should be positioned in order to define the viewing axis (e.g., normal to the display). For a red pixel under a red color filter, the adjoining color filers are green and blue so there are three pixel pitches (microlenses) to the next red filter and microlens to form a secondary window.

In one or more implementations of the present disclosure, on-axis light emissions 407 may transmit through the second filler material 406, the first filler material 412, the color filter layer 416, and the microlens 410 in a narrowly-defined emission profile.

In one or more implementations, the first filler material 412 having the lower index and the second filler material 406 having the higher index create an interface 408 between the first filler material 412 and the second filler material 406 such that a portion of off-axis emissions, such as the tertiary off-axis emission 409b, from the subpixel 404a is reflected within the light emitting structure 400 by TIR without reaching the first filler material 412, thus tertiary emission 409b is removed.

In one or more implementations, the example structure 400 differs from the example structure 300 in that the glass cover 314 in FIG. 3 is replaced with a color filter layer 416 in order to remove secondary emissions 409a. In FIG. 4, the color filter layer 416 may include an array of color filters arranged (e.g., red, green, blue color filters horizontally arranged in an alternating manner) so that specific-color light emissions 407 (e.g., red color emissions or a narrowly-confined on-axis emission profile that is red) may emit from the sub-pixel 404a and pass through a corresponding color filter (e.g., red filter) 416a that is positioned directly above the sub-pixel 404a. Moreover, color filters that are adjacent (e.g., on the left and right of the red filter) to the corresponding-color filter 416a located directly above the sub-pixel 404a are designed to only transmit other color emissions (e.g., green and blue light emissions). Due to the interface 408 and the color filter layer 416, the secondary and tertiary off-axis emissions 409a, 409b are removed, thus further narrowing the overall emission profile of the light emitting structure 400 as compared to the light emitting structure 300.

In one or more implementations, the color filter layer 416 may be above microlens layer 410, or the microlens layer 410 may be integrally made with colors. In other implementations, the color filter layer 416 and the first filler material (lower index layer) 412 may not be required to be arranged as shown in example structure 400 in FIG. 4 as long as the first filler material 412 is below the microlens layer 410. The multiple layers of the example structure 400 may be rearranged as discussed above as long as light emissions from the sub-pixel (e.g., 404a) travel through a layer with a higher refractive index (e.g., the second filler material 406) then subsequently through a layer with a lower index (e.g., the first filler material 412).

Figure 5:
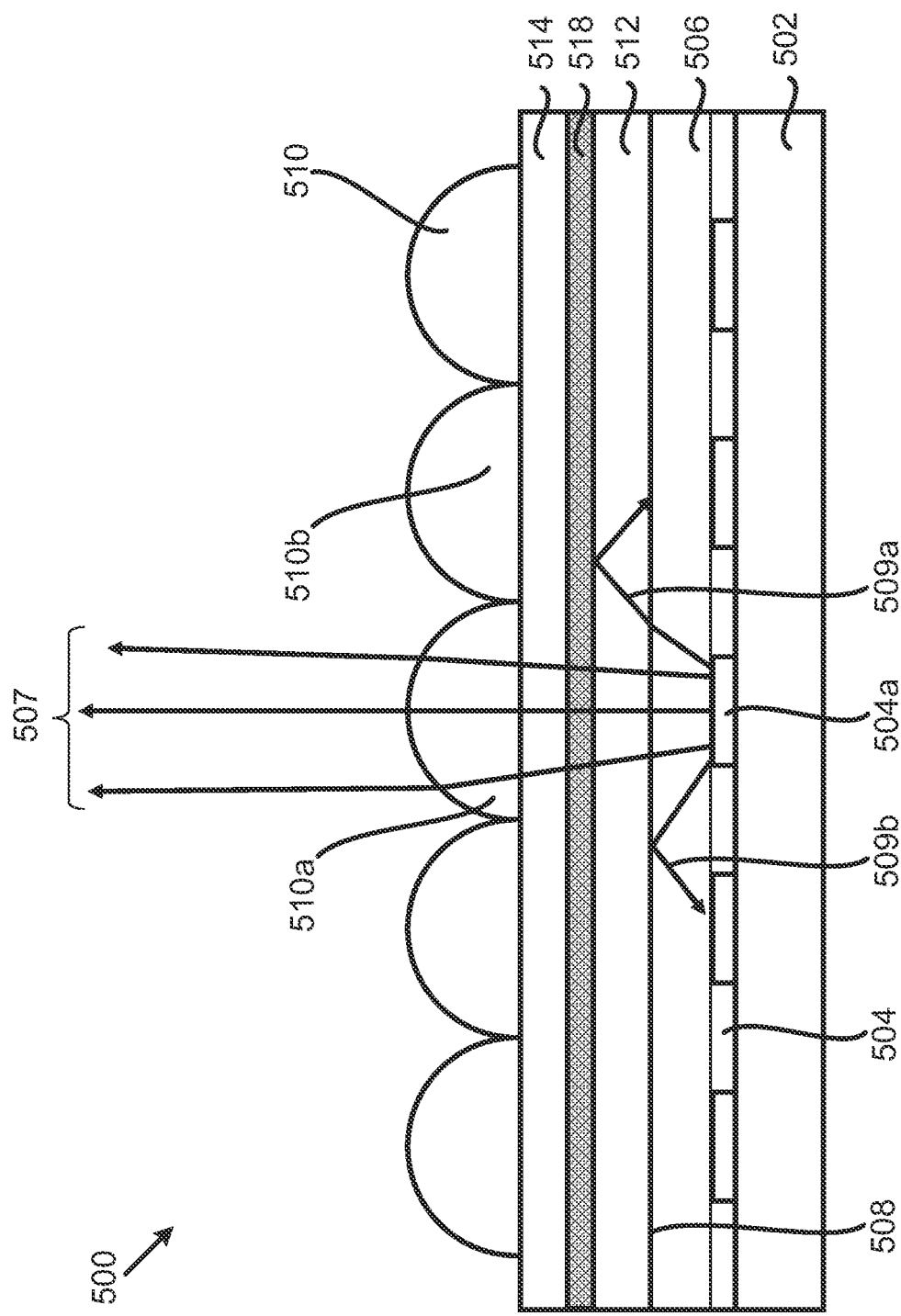
FIG. 5 is a schematic cross-sectional view of an example light emitting structure in accordance with an example implementation of the present disclosure.

FIG. 5 is a schematic cross-sectional view of an example light emitting structure 500 in accordance with an example implementation of the present disclosure. In FIG. 5, the example light emitting structure 500 may include a substrate 502, a pixel layer 504 including a plurality of sub-pixels (e.g., 504a), a second filler material 506, a first filler material 512, an interference filter layer 518, a glass substrate 514, and a microlens layer 510 including a plurality of microlenses (e.g., 510a, 510b). In one or more implementations of the present disclosure, the substrate 502, the pixel layer 504 including the plurality of sub-pixels, the second filler material 506, the first filler material 512, and the microlens layer 410 may correspond to the substrate 402, the pixel layer 404 including the plurality of sub-pixels, the second filler material 406, the first filler material 412, and the microlens layer 406, respectively, of the structure 400 in FIG. 4. Therefore, the details of the example structure 500 are omitted for brevity.

In one or more implementations of the present disclosure, on-axis light emissions or a narrowly-confined on-axis emission profile 507 may transmit through the second filler material 506, the first filler material 512, the interference filter layer 518, the glass substrate 514, and the microlens 510 in a narrow emission profile.

In one or more implementations, the first filler material 512 having the lower index and the second filter material 506 having the higher index create an interface 508 between the first filler material 512 and the second filler material 506 such that a portion of off-axis emissions, such as the tertiary off-axis emission 509b, from the subpixel 504a is reflected within the light emitting structure 500 by TIR without reaching the first filler material 512, thus tertiary emission 509b is removed. Also, any light that would leak through the boundary between the layers 506 and 512 (e.g., by scatter, poor adhesion, etc. or even a bend in the panel) would be reduced further by the additional interference layer 518 or color filter layer.

In one or more implementations, the example structure 500 in FIG. 5 differs from the example structure 400 in that the color filter layer 416 in FIG. 4 is replaced by the interference filter layer 518 and the glass substrate 514. An alternative or addition to a color filter layer may be the interference filter layer 518. The interference filter layer 518 is designed to transmit three bands of wavelengths, with each band centered on the red, green, and blue emissions that are on-axis emissions 507. However, transmission of the interference filter layer 518 changes for off-axis emissions. For example, if the red, green, and blue emissions from the sub-pixel 504a are emitted on-axis (e.g., 507) with respect to the interference filter layer 518, the on-axis color emissions may transmit through the interference filter layer 518, the glass cover 514, and the microlens layer 510. However, if the color emissions from the sub-pixel 504a are off-axis, for example, secondary emissions 509a that are on the path of entering a microlens adjacent (e.g., 510b) to the microlens (e.g., 510a) directly above the sub-pixel 504a, the secondary emissions 509 may be reflected by the interference filter layer 518. Due to the interface 508 and the interference filter layer 518, the secondary and tertiary off-axis emissions are removed, thus narrowing the overall emission profile of the light emitting structure 500.

Figure 6A:
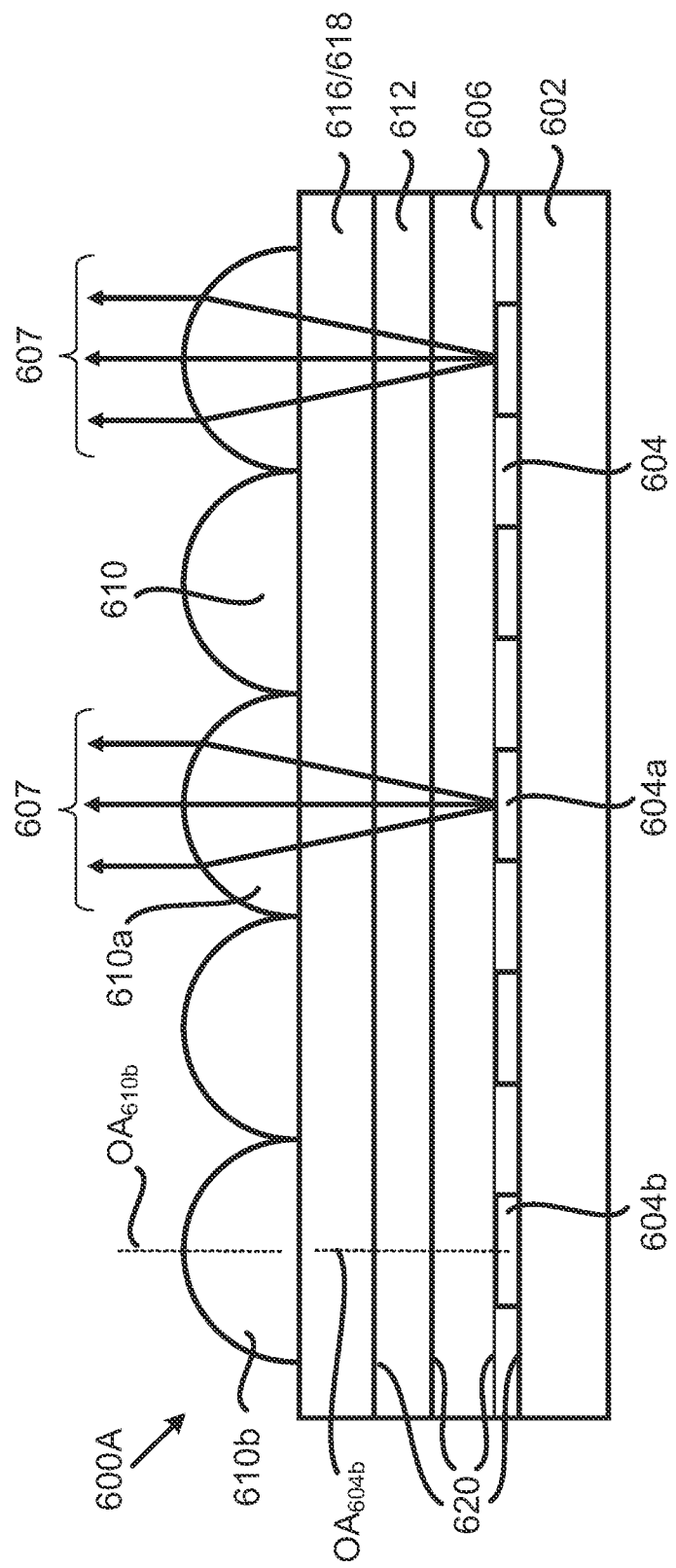
FIG. 6A is a schematic cross-sectional view of an example light emitting structure in accordance with an example implementation of the present disclosure.

FIG. 6A is a schematic cross-sectional view of an example light emitting structure 600A in accordance with an example implementation of the present disclosure.

In FIG. 6A, the example light emitting structure 600A may include a substrate 602, a pixel layer 604 including a plurality of sub-pixels (e.g., 604a, 604b), a second filler material 606, a first filler material 612, a color filter layer 616 or an interference filter layer 618, and a microlens layer 610 including a plurality of microlenses (e.g., 610a, 610b). In one or more implementations of the present disclosure, the substrate 602, the pixel layer 604 including the plurality of sub-pixels, the second filler material 606, the first filler material 612, and the microlens layer 610 may correspond to the substrate 402, the pixel layer 404 including the plurality of sub-pixels, the second filler material 406, the first filler material 412, and the microlens layer 406, respectively, of the structure 400 in FIG. 4 or may correspond to the substrate 502, the pixel layer 504 including the plurality of sub-pixels, the second filler material 506, the first filler material 512, and the microlens layer 510, respectively, of the structure 500 in FIG. 5. Therefore, the details of the example structure 600A are omitted for brevity.

In one or more implementations of the present disclosure, the example structure 600A may be different from the example structures 400 in FIG. 4 and 500 in FIG. 5 in that example structure 600A may include either a color filter layer 616, an interference filter layer 618, or a combination of both the color filter layer 616 and the interference filter layer 618 so that secondary off-axis emissions may be removed and only narrowly-confined on-axis emission profiles 607 may be emitted through the second filler material 606, the first filler material 612, the color filter layer 616 or the interference filter layer 618, and the microlens layer 610.

In one or more implementations, the example structure 600A may also be different from the example structures 400 in FIG. 4 and 500 in FIG. 5 in that the example structure 600A may further include one or more shear adhesive layers (e.g., at least one shear adhesive layer 620). The at least one shear adhesive layer 620 may be included between the substrate 602 and the pixel layer 604, the pixel layer 604 and the second filler material 606, the second filler material 606 and the first filler material 612, the first filler material 612 and the color filter layer 616 or the interference filter layer 618, and between the color filter layer 616 or the interference filter layer 618 and the microlens layer 610 to maintain optical alignment of at least one microlens (e.g., 610b) in the microlens layer 610 with at least one sub-pixel (e.g., 604b) in the pixel layer 604 (see FIGS. 6A and 6B) while providing the narrowly-confined on-axis emission profiles 607. The one or more shear layers allow the layers to move freely along but not away from each other. The layers must be fixed however along one line that determines the main collimation direction (e.g., the center of the panel) and perpendicular to the bend direction. In one implementation, an optical axis (e.g., $OA_{604b}$) through the center of the sub-pixel 604b, for example, may align with an optical axis (e.g., $OA_{610b}$) through the center of the microlens 610b. In one or more implementations, the shear adhesive layers 620 may be low viscosity adhesives or vertical supporting structures. FIG. 6A illustrates the example light emitting structure 600A under minimal elastic deformation.

FIG. 6B is a schematic cross-sectional view of the example light emitting structure 600A in FIG. 6A, under elastic deformation in accordance with an example implementation of the present disclosure.

In FIG. 6B, the example light emitting structure 600B may include a substrate 602, a pixel layer 604 including a plurality of sub-pixels (e.g., 604*a*, 604*b*), a second filler material 606, a first filler material 612, a color filter layer 616 or an interference filter layer 618, and a microlens layer 610 including a plurality of microlenses (e.g., 610*a*, 610*b*). In one or more implementations of the present disclosure, the substrate 602, the pixel layer 604 including the plurality of sub-pixels, the second filler material 606, the first filler material 612, and the microlens layer 610 are substantially the same as the example structure of 600A in FIG. 6A and may correspond to the substrate 402, the pixel layer 404 including the plurality of sub-pixels, the second filler material 406, the first filler material 412, and the microlens layer 406, respectively, of the structure 400 in FIG. 4 or may correspond to the substrate 502, the pixel layer 504 including the plurality of sub-pixels, the second filler material 506, the first filler material 512, and the microlens layer 510, respectively, of the structure 500 in FIG. 5. Therefore, the details of the example structure 600B are omitted for brevity.

In one or more implementations, the example structure 600B may be substantially identical to the example structure 600A in FIG. 6A. However, the example 600B differs from the example structure 600A in that the example light emitting structure 600B is under substantial or noticeable elastic deformation (e.g. bent in example structure 600B in FIG. 6B) and the example structure 600B has at least one shear adhesive layer 620 between any two of the substrate 602, the pixel layer, the second filler material 606, the first filler material 612, the color filter layer 616 or the interference filter layer 618, and the microlens layer 610 that are also under elastic deformation. When the example structure 600B is under elastic deformation, the at least one shear adhesive layer 620 may continue to maintain optical alignment of at least one microlens (e.g., 610*b*) in the microlens layer 610 with at least one sub-pixel (e.g., 604*b*) in the pixel layer 604 so that narrowly-confined on-axis emission profiles 607 are provided. The at least one shear adhesive layer 620 allows for some shear motion between any two layers above while continue to confine separation between the microlens layer 610 and the pixel layer 604. The light emitting structure 600B with at least one shear adhesive layer 620 allows the microlenses (e.g., 610*a*, 610*b*) in the microlens layer 610 to move in a transverse direction relative to the sub-pixels (e.g., 604*a*, 604*b*) in the sub-pixel layer 604 while maintaining optical alignment with respect to the microlenses, the sub-pixels, and viewer's eyes when the light emitting structure 600B is bent. In one implementation, when the light emitting structure 600B including multiple layers is bent, an optical axis (e.g., $OA_{604b}$) through the center of the sub-pixel 604*b*, for example, may align with an optical axis (e.g., $OA_{610b}$) through the center of the microlens 610*b*, so that the curved or bent light emitting structure 600B that may be housed in a display device could be perceived with similar display brightness at different angles.

In some implementations, if each of the layers (substrate 602, pixel layer 604, second filler material 606, first filler material 612, color filter layer 616 or interference filter layer 618, and microlens layer 610) is firmly bonded together by at least one shear adhesive layer 620 to allow some degree of shear, and when the light emitting structure 600B applied to a curved display device is bent, stress and strain within most layers may be minimized while the microlens layer 610 and the sub-pixels (e.g., 604*a*) may remain optically aligned. In some implementations, the layers are only bonded not to move away but only firmly bonded on one line perpendicular to the intended bend.

From the present disclosure, it can be seen that various techniques may be used for implementing the concepts described in the present disclosure without departing from the scope of those concepts. While the concepts have been described with specific reference to certain implementations, a person of ordinary skill in the art may recognize that changes may be made in form and detail without departing from the scope of those concepts.

As such, the described implementations are to be considered in all respects as illustrative and not restrictive. It should also be understood that the present disclosure is not limited to the particular implementations described but rather many rearrangements, modifications, and substitutions are possible without departing from the scope of the present disclosure.

What is claimed is:

1. A light emitting structure, comprising:
a pixel layer having at least one subpixel;
a microlens layer having at least one microlens, the at least one microlens aligned with the at least one sub-pixel for providing a narrowly-confined on-axis emission profile along an on-axis direction;
a first filler material layer and a second filler material layer between the pixel layer and the microlens layer, an interface between the first filler material layer and the second filler material layer configured for reflecting a portion of off-axis emissions from the at least one subpixel by a total internal reflection (TIR); and
one or more filter layers between the pixel layer and the microlens layer, the one or more filter layers configured for preventing another portion of the off-axis emissions from interfering with on-axis emissions of at least one adjacent subpixel, wherein:
the other portion of the off-axis emissions includes light emitted along an off-axis direction at an angle to the on-axis direction towards at least one neighboring microlens of the at least one adjacent subpixel,
the light emitted along the off-axis direction, which otherwise passes through the at least one neighboring microlens, is filtered by the one or more filter layers,
the one or more filter layers include at least one of a color filter layer and a triple pass filter layer,
the light emitted along the off-axis direction is absorbed by the color filter layer, and
the light emitted along the off-axis direction is reflected by the triple pass filter layer via the TIR.

2. The light emitting structure of claim 1, wherein the first filler material layer is formed on the second filler material layer, a first refractive index of the first filler material layer is lower than a second refractive index of the second filler material layer.

3. The light emitting structure of claim 1, wherein the portion of the off-axis emissions includes the light emitted along the off-axis direction at the angle to the on-axis direction towards the at least one neighboring microlens of the at least one adjacent subpixel, wherein the light emitted along the off-axis direction, which otherwise passes through the at least one neighboring microlens, is reflected by the interface via the TIR.

4. The light emitting structure of claim 1, wherein the narrowly-confined on-axis emission profile includes light emitted along the on-axis direction through only the at least one microlens.

5. The light emitting structure of claim 1, wherein:
the color filter layer includes at least one color filter, the at least one color filter aligned with the at least one subpixel for passing at least one on-axis emission from the at least one subpixel and filtering at least one off-axis emission from the at least one adjacent subpixel.

6. The light emitting structure of claim 1, further comprising one or more shear adhesive layers between the pixel layer and the microlens layer, wherein the one or more shear adhesive layers are configured to maintain optical alignment of the at least one microlens with the at least one subpixel for providing the narrowly-confined on-axis emission profile when the light emitting structure is subjected to elastic deformation.

7. The light emitting structure of claim 1, further comprising one or more shear adhesive layers between the pixel layer and the microlens layer, wherein at least one of the one or more shear adhesive layers includes a low viscosity adhesive material or a vertical-supporting adhesive material.

8. A light emitting structure, comprising:
a pixel layer having at least one subpixel;
a microlens layer having at least one microlens, the at least one microlens aligned with the at least one subpixel for providing a narrowly-confined on-axis emission profile along an on-axis direction;
a first filler material layer and a second filler material layer between the pixel layer and the microlens layer, an interface between the first filler material layer and the second filler material layer configured for reflecting a portion of off-axis emissions from the at least one subpixel by a total internal reflection (TIR);
one or more filter layers between the pixel layer and the microlens layer, the one or more filter layers including one of a color filter layer and a triple pass filter layer, wherein light emitted along an off-axis direction is absorbed by the color filter layer, and light emitted along the off-axis direction is reflected by the triple pass filter layer via the TIR; and
one or more shear adhesive layers between the pixel layer and the microlens layer, the one or more shear adhesive layers configured to maintain optical alignment of the at least one microlens with the at least one subpixel for providing the narrowly-confined on-axis emission profile when the light emitting structure is subjected to elastic deformation,
wherein the first filler material layer is formed on the second filler material layer, a first refractive index of the first filler material layer is lower than a second refractive index of the second filler material layer such that the interface reflects the portion of the off-axis emissions from the at least one subpixel by the TIR.

9. A display device, comprising:
a pixel layer having a plurality of subpixels;
a microlens layer having a plurality of microlenses, each of the plurality of microlenses being aligned with a corresponding one of the plurality of subpixels;
a first filler material layer and a second filler material layer between the pixel layer and the microlens layer, an interface between the first filler material layer and the second filler material layer configured for reflecting a portion of off-axis emissions from the plurality of subpixels by a total internal reflection (TIR); and
at least one of a color filter layer and a triple pass filter layer between the pixel layer and the microlens layer, the at least one of the color filter layer and the triple pass filter layer configured for preventing another portion of the off-axis emissions from interfering on-axis emissions from the plurality of subpixels.

10. The display device of claim 9, wherein the triple pass filter layer includes a plurality of triple pass filters for passing the on-axis emissions and filtering the off-axis emissions, and
the color filter layer includes at least one color filter, the at least one color filter aligned with at least one of the plurality of subpixels for passing at least one on-axis emission from the at least one of the subpixels and filtering at least one off-axis emission from at least one adjacent subpixel.

11. The display device of claim 9, wherein the first filler material layer is formed on the second filler material layer, and a first refractive index of the first filler material layer is lower than a second refractive index of the second filler material layer.

12. The display device of claim 9, wherein the portion of the off-axis emissions includes light emitted along an off-axis direction at an angle to an on-axis direction towards at least one neighboring microlens of at least one adjacent subpixel, wherein the light emitted along the off-axis direction, which otherwise passes through the at least one neighboring microlens, is reflected by the interface via the TIR.

13. The display device of claim 9, wherein the other portion of the off-axis emissions includes light emitted along an off-axis direction at an angle to an on-axis direction towards at least one neighboring microlens of at least one adjacent subpixel, wherein the light emitted along the off-axis direction, which otherwise passes through the at least one neighboring microlens, is absorbed by the color filter layer or is reflected by the triple pass filter layer via the TIR.

14. The display device of claim 9, further comprising one or more shear adhesive layers between the pixel layer and the microlens layer, wherein the one or more shear adhesive layers are configured to keep at least one of the plurality of microlenses aligned with the corresponding one of the plurality of subpixels when the display device is subjected to elastic deformation.

15. The display device of claim 9, further comprising one or more shear adhesive layers between the pixel layer and the microlens layer, wherein the one or more shear adhesive layers are configured to keep at least one of the plurality of microlenses aligned with the corresponding one of the plurality of subpixels when the display device is subjected to elastic deformation.

16. The display device of claim 9, wherein:
light emitted along an off-axis direction is absorbed by the color filter layer, and
light emitted along the off-axis direction is reflected by the triple pass filter layer via the TIR, the display device further comprising:
one or more shear adhesive layers between the pixel layer and the microlens layer, and the one or more shear adhesive layers configured to maintain optical alignment of the at least one microlens with the at least one subpixel for providing the narrowly-confined on-axis emission profile when the display device is subjected to elastic deformation,
wherein the first filler material layer is formed on the second filler material layer, and a first refractive index of the first filler material layer is lower than a second refractive index of the second filler material layer such that the interface reflects the portion of the off-axis emissions from the at least one subpixel by the TIR.

* * * * *